United States Patent [19]

Aiuola et al.

[11] 3,753,484
[45] Aug. 21, 1973

[54] HANDLING DEVICE FOR DELICATE ARTICLES

[75] Inventors: Franco Aiuola, Bologna; Luciano Nannini, Casalecchio Di Reno, both of Italy

[73] Assignee: Azionaria Costruzioni Macchine Automatiche A.C.M.A. S.P.A., Bologna, Italy

[22] Filed: July 19, 1972

[21] Appl. No.: 273,229

[52] U.S. Cl. ............... 198/20 R, 198/24, 198/32, 198/34, 198/165, 302/11
[51] Int. Cl. .................. B65g 47/22, B65g 47/52
[58] Field of Search .................. 198/20 R, 24, 32, 198/34, 165; 302/2 R, 11–13

[56] References Cited
UNITED STATES PATENTS

| | | | |
|---|---|---|---|
| 1,312,640 | 8/1919 | Mallinckrodt | 198/34 X |
| 2,152,970 | 4/1939 | Ness | 198/34 |
| 3,185,277 | 5/1965 | Agnew | 198/31 R X |
| 3,224,549 | 12/1965 | Cella et al. | 198/34 X |
| 3,244,267 | 4/1966 | Berta | 198/32 |
| 3,329,469 | 7/1967 | Stadelman | 302/11 |

Primary Examiner—Evon C. Blunk
Assistant Examiner—W. Scott Carson
Attorney—Guido Modiano and Albert Josif

[57] ABSTRACT

A device for placing at regular distances delicate objects coming from a production line onto a receiving line. The objects are firstly pushed from the production line into a channel and then accelerated therein by a jet of air until they are engaged by pulling elements projecting from the bottom of the channel and arranged on an endless chain moving at the same speed of said receiving line. At the end of the channel the objects pass into receptales defined by the adjacent portion of a pair of parallel belts, from which they are expelled onto the receiving line by means of ejectors mounted on an endless belt located above said pair of belts.

3 Claims, 2 Drawing Figures

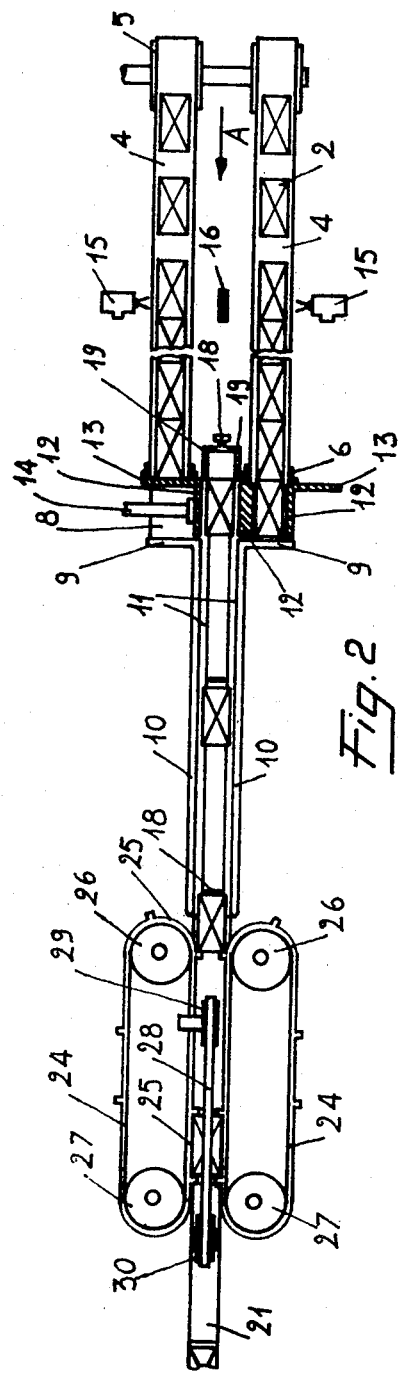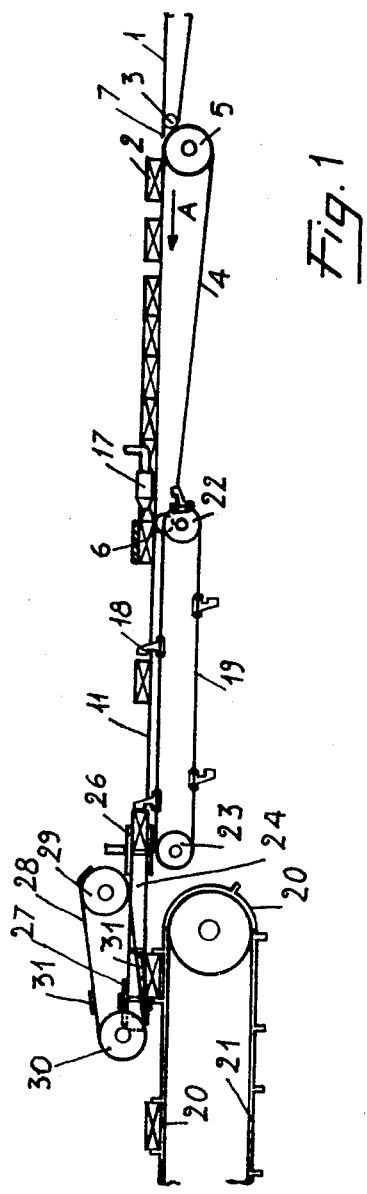

HANDLING DEVICE FOR DELICATE ARTICLES

BACKGROUND OF THE INVENTION

The present invention relates to a device for the handling and placing at regular distances of delicate articles, such as soap, onto a continuously moving receiving line. It is well known that there is difficulty in handling products of a delicate or fragile nature without causing them damage, especially when these products come from production machines at speeds and rhythms that —even though perhaps slow — are variable, and then pass onto continuously moving receiving lines for further processing. Such a problem now exists particularly in the field of soap manufacturing, where continuously operating presses are used. In such presses the pieces of soap, obtained through extrusion and cutting and therefore not yet hard, must be, as a matter of fact, placed in rows of receptacles on the conveyor belts of such continuous-motion presses without suffering damage. The object of the present invention is therefore to solve such a problem in a simple and rational manner.

SUMMARY OF THE INVENTION

In accordance with the invention, the device for the placing of delicate or fragile articles coming from a production line onto a continuously-moving receiving line comprises an intercepting mechanism, cross-wise to such production line, for stopping the articles that are arriving, a channel extending from the production line to the receiving line, transfer means working in conjunction with such intercepting mechanism, for transferring the articles from the production line into the channel, at least one nozzle positioned at the entrance of the channel and cyclically connected to a source of compressed air so as to emit a jet of air capable of pushing forward and accelerating every article along the channel, pulling devices fixed onto chains in endless-belt fashion and moving at the same speed and in synchronization with the receiving line below the channel, said pulling devices containing a portion projecting within the channel for pulling the articles already in acceleration along such channel, a pair of belts extending from the outlet end of the channnal onto the receiving line and having two opposed and parallel sections which are provided with pushers in the form of cavities open on the bottom for receiving and retaining the articles coming from the channel said belts being driven at the same speed as said receiving line, an endless belt equipped with ejectors which push the articles out of the cavities into respective receptacles in the lower-placed receiving line.

BRIEF DESCRIPTION OF THE DRAWING

Further details of the invention will become clearer from the description, given below, of a preferred but not exclusive embodiment of the device covered by the invention, illustrated in the attached drawing, in which:

FIG. 1 shows a schematic longitudinal elevation view of the device in question as a whole; and FIG. 2, in scale larger than for FIG. 1, shows the same device in plan view.

DESCRIPTION OF THE PREFERRED EMBODIMENT

With reference to the above figures, in which a given element or part shown several times is indicated with the same number, 1 represents two continuously-moving belts, whose upper portions proceed in the direction indicated by the arrow A and bring to the device in question, along two parallel paths, objects or articles 2 of delicate or fragile nature; such objects are particularly pieces of soap produced through extrusion and cutting by the drawing or profiling machines and not yet hard. FIG. 1 shows only the end part of one such belt 1, which winds around roller 3, the same belts 1 have been omitted in FIG. 2.

Following belts 1 and in line with them are respectively belts 4, which wind around rollers 5 and 6, supported in rotating manner by the framework of the device in question. Belts 4, driven by motorized means which are a part of the device in question (not shown), operate in continuous motion, and their upper portions also travel in the direction of arrow A. Articles or objects 2, leaving belts 1 for belts 4, pass over supports 7 fixed on the framework of the device; also fixed on such framework are shelves or support brackets 8, which receive the objects 2 at the end of belts 4. At the opposite edge from said belts and cross-wise to them, side-walls 9 extend upward from shelves 8 to stop said objects 2, which thus accumulate one behind the other, while belts 4 slide under them. The shelves 8 and sidewalls 9 form the inlet area of a channel, whose sidewalls are indicated as 10 and whose bottom is composed of two elements indicated with 11; elements 10 and 11 of the channel are fixed to the framework of the device. The channel is horizontal and extends in parallel relationship to belts 4 along the centerline of the latter. In the inlet area of the channel there is a receptacle-propulsion mechanism composed of three vertical uprights 12 parallel with each other and to belts 4. Between each pair of contiguous uprights 12, which constitute the mechanism for transfer of objects 2 from line 4 into channel 10-11, it is possible for one of the objects 2 to enter. The two external walls or uprights 12 are each furnished on the back edge with wings 13 turned toward the outside. Wings 13 are cross-wise to belts 4 and in line with each other. To one of the external walls of the propelling mechanism is joined a shaft 14, which is cross-wise to belts 4 and is driven in alternating movement in a cross-wise direction. When (see FIG. 2) one of the receptacles formed by walls 12 is in line with one of the belts 4, the other receptacle is in line with channel 10-11 and, in the end, wing 13 joined to the latter receptacle intercepts the objects coming on the other belt 4. When shaft 14 completes one of its alternating movements, the receptacle of the propelling mechanism, which was aligned with one of the belts and which had therefore become filled up with one of the objects 2, moves into line with the channel, while the receptacle that was in line with the channel and (as will be seen farther on) had emptied itself, moves into line with the other belt 4. The introduction of the objects 2 into the receptacles of the propelling mechanism 12 - 13 is assured if a certain number of objects 2 have accumulated on belts 4; to assure the proper accumulation of said objects on belts 4, two photoelectric cells 15 are planned and the pertinent reflector 16 (see FIG. 2); the cells are located at the sides of belts 4 and a little above the upper portions of same, at a certain distance from the propelling mechanism 12 - 13.

At the beginning of channel 10-11, and in line with it, is located a nozzle 17. When one of the objects 2 is propelled into channel 10-11, a valve arrangement actuated in cycles properly synchronized with the propelling mechanism and with certain components of the device (which will be seen further on) connects nozzle 17 with a source of compressed air. In this manner object 2 is pushed forward by the jet of air from the nozzle and speeded up along the channel. Advantageously, channel 10–11 is covered with material having a low coefficient of friction, for example, TEFLON. While being speeded up, object 2 is caught by one of the pulling devices (dogs) 18 carried by the pair of chains 19, and it is then pulled by it along the channel; the front part of the pullers or dogs is covered with elastic material soft enough not to damage objects 2. The pulling devices are spaced on the chains 19 at the same distance as that of the spacing of the receptacles 20 on the subsequent belt 21 of the receiving line; in addition, the speed of travel of chains 19 is equal to that of belt 21; the chains wind around toothed wheels 22 and 23 which are supported in rotating manner by the framework of the device below channel 10–11, and their upper portions always advance in the direction of the continuous motion. Pulling devices 18 then enter into channel 10–11 passing between elements 11 of the channel and operating above said elements; their entry into the channel takes place with a certain delay in relation to the entry of the corresponding objects 2 and in relation to the instant when said objects are pushed forward by the air-jet from nozzle 17. The pulling devices are joined to the chains and are then provided with appendages having little rollers, which engage stationary cams positioned along the upper section of chains 19. When the pulling devices are ready to release objects 2, the cams are no longer at hand, and the pulling devices themselves — retracted by their own weight and/or by means of springs — are carried into release position with a rotating movement which, in FIG. 1, is clockwise. Before releasing the object 2, pulling device 18 inserts it between the contiguous portions of a pair of belts 24 running opposite each other, positioning it in a corresponding receptacle or confined space 25 of said belt 24. The two belts 24 wind on respective rollers having a vertical axis 26 and 27 and being located above the beginning of belt 21; their contiguous portions always advance in the direction A at the same speed as that of belt 21 and of chains 19 and form a prolongation of the side-walls 10 of channel 10–11. The receptacles of belt 24, composed, as those of belt 21, of pairs of peripheral and cross-wise projecting points, are synchronized with those of belt 21 and are spaced at equal distance.

Between the two belts 24 there is finally endless belt 28 running on rollers 29 and 30, whose lower section, beginning with the outlet of channel 10–11, descends slightly toward the floor and progressively intersects receptacles 25. In this manner the peripheral projecting points 31 on belt 28, also those in elastic and sufficiently soft material, progressively push out object 2 held by the two belts 24 and cause it to descend into the underlying receptacle 20 of belt 21. The lower section of belt 28, advances from roller 29 to roller 30, located downstream, of continuous speed, and the projecting points 31 are synchronized and spaced evenly with receptacles 25 of belts 24 and with receptacles 20 of belts 21.

We claim:

1. A device for placing at regular distances delicate or fragile objects coming from a production line onto a continuously moving receiving line characterized in that it comprises an intercepting mechanism (13) cross-wise to such production line (4) for stopping the objects in arrival (2), a channel (10–11) extending between the production line (4) and the receiving line (21), means of transfer (12) operating in coordination with such intercepting mechanism for the transfer of the objects (2) of the production line (4) into the channel (10–11), at least one nozzle (17) placed at the entrance of channel (10–11) and cyclically connected to a source of compressed air, so as to emit a jet of air suitable for pushing forward and accelerating each object (2) along channel (10–11), pulling elements (18) spaced on chains (19) in endless-belt fashion and travelling at the same speed as and in synchronized manner with the receiving belt (21) below the channel (10,11), said pulling devices containing a portion which projects within the channel for pulling objects (2) already in acceleration along such channel, a pair of belts (24) extending from the exit of the channel to above the receiving line (21) and having two opposed and parallel sections which are equipped peripherally with projections forming receptacles or seating (25) open below for receiving and holding objects (2) coming from the channel, said belts (24) being driven at the same speed as that of the receiving line (21), an endless belt (28) equipped with ejectors that push the objects outside the seatings (25) into the respective receptacles (20) of the lower-lying receiving line (21).

2. A device, as claimed in claim 1, wherein said belt (28) lies in a vertical plane passing between the contiguous sections of said pair of belts (24) and that the lower section of said belt (28), beginning from the exit of said channel (10,11), descends toward the receiving line (21) and intersects said pair of belts (24).

3. A device, as claimed in claim 1, wherein the production line is composed of a pair of parallel production belts (4) between which said channel (10,11) extends along the median line, and that said transfer device comprises a propulsion mechanism equipped with a pair of receptacles (12) and actuated with alternating movement cross-wise in respect to belts (4) so that, while one of said receptacles is aligned with a production belt (4), the other is aligned with channel (10,11) and vice versa, said propulsion mechanism being provided with wings (13) which intercept objects (2) arriving on the production belt not aligned with receptacles (12).

* * * * *

UNITED STATES PATENT OFFICE
CERTIFICATE OF CORRECTION

Patent No. 3,753,484        Dated August 21, 1973

Inventor(s) Franco Aiuola et al.

It is certified that error appears in the above-identified patent and that said Letters Patent are hereby corrected as shown below:

On the cover sheet, in the heading, insert

--[30] Foreign Application Priority Data

July 24, 1971         Italy         3481 A/71 --.

Signed and sealed this 18th day of June 1974.

(SEAL)
Attest:

EDWARD M. FLETCHER, JR.          C. MARSHALL DANN
Attesting Officer                  Commissioner of Patents